United States Patent [19]

Kaku et al.

[11] Patent Number: 4,928,191
[45] Date of Patent: May 22, 1990

[54] TAPE LOADING MECHANISM FOR A ROTATING DRUM AND CASSETTE TYPE MAGNETIC RECORDING AND/OR REPRODUCTION APPARATUS

[75] Inventors: Nobuyuki Kaku, Yokohama; Tatsuya Shigemura; Masaki Uesugi, both of Katsuta; Kiyoshi Kano; Kenji Ogiro, both of Yokohama, all of Japan

[73] Assignee: Hitachi, Ltd., Tokyo, Japan

[21] Appl. No.: 211,436

[22] Filed: Jun. 24, 1988

[30] Foreign Application Priority Data

Jun. 25, 1987 [JP] Japan .................................. 62-156578
Aug. 20, 1987 [JP] Japan .................................. 62-205004

[51] Int. Cl.⁵ ............................................ G11B 15/665
[52] U.S. Cl. ......................................................... 360/85
[58] Field of Search .................................... 360/85, 137

[56] References Cited

FOREIGN PATENT DOCUMENTS

60-18848 1/1985 Japan .

Primary Examiner—Robert S. Tupper
Attorney, Agent, or Firm—Antonelli, Terry, Stout & Kraus

[57] ABSTRACT

A tape loading mechanism of a video tape recorder includes a tape guide carrier for driving first and second groups of tape guides for pulling out withdrawing a tape from a cassette and winding the tape to a tape guide drum having an arcuate shape so as to rotate around the tape guide drum and drive the tape guide groups. The tape guide groups are mounted to end of the tape guide carrier and the carrier is disposed at the intermediate position of height between the first and second tape guide groups held by a positioning mechanism. Accordingly, the rotating plane of the tape guide carrier rotating around the guide drum is positioned between the first and second tape guide groups.

9 Claims, 9 Drawing Sheets

UNLOADING ← → LOADING

TAPE LOADING MECHANISM FOR A ROTATING DRUM AND CASSETTE TYPE MAGNETIC RECORDING AND/OR REPRODUCTION APPARATUS

BACKGROUND OF THE INVENTION

1. Field of the Invention

The present invention relates to a tape loading mechanism of a rotating drum and cassette type magnetic recording and/or reproduction apparatus such as a Video Tape Recorder (VTR), and, more particularly, to a tape loading mechanism of a magnetic recording and/or reproducing apparatus which will be suitable for a compact VTR with a camera, or the like.

2. Description of the Prior Art

A tape loading mechanismm which pulls out a tape from a cassette and wnds the tape at a predetermined angle to a tape guide drum is one of the major factors that determines the size of the mechanism of a magnetic recording and/or reproduction apparatus.

To cope with VTRs with a camera such as VHS-C cassettes, in, for example, Japanese Patent Laid-Open No. 18848/1985, a tape loading mechanism is proposed which includes a ring arrangement for providing a necessary wide angle wrapping for a four-head small diameter drum system. Namely, the ring (tape guide carrier) is disposed substantially concentrically along a periphery of a tape guide drum, with a built-in rotary head and a group of tape guides being connected to the ring so that the tape is loaded and unloaded upon a rotation of the ring. The tape guide drum is mounted slantingly to a chassis. This ring system can attain easier and simpler wrapping with a wider angle to the drum than by the conventional arm system and does not require complicated joint arms thereby reducing the number of necessary components.

The above-described proposed technique prior art technique reduces the tilt angle of the tape guide drum in order to enable a wide angle wrapping; however, no consideration is given to making the apparatus compact. In other words, the tape loading ring is positioned below the group of tape guides at the loading end position; therefore, the height of the loading mechanism is considerable thereby resulting in the height of the mechanism becoming relatively large.

To solve this problem, it has been proposed to dispose the ring outside the group of tape guides so as not to overlap a plane containing the group of tape guides and the ring at the loading end position. Though capable of reducing the thickness or height of the mechanism, this system is not problem free since the size of the ring and hence the planar area are so great that the mechanism of the apparatus cannot be made compact.

SUMMARY OF THE INVENTION

In order to avoid the problems encountered in the prior art described above, the present invention provides a tape loading mechanism of a magnetic recording and/or reproduction apparatus which can simultaneously reduce the planar area and height of the apparatus.

For this purpose, according to the present invention, a tape loading mechanism of a magnetic recording and/or reproduction apparatus is provided wherein each tape guide carrier for driving the group of tape guides for loading has an arcuate shape, with the group of tape guides including a first group, for example, an entrance group of tape guides for horizontally pulling out or withdrawing a magnetic tape from a cassette and winding the tape to a tape guide drum, with a second group, for example, an exit group, of tape guides for slantingly pulling out or withdrawing the magnetic tape from a cassette from a predetermined position and winding the tape to the tape guide drum. The tape guide carrier is disposed at the intermediate height between the first and second groups of tape guides at a tape loading end position so that a rotating plane of the tape guide carrier is positioned at a height between the first and second groups of tape guides.

The tape loading mechanism of a magnetic recording and/or reproduction apparatus of the present invention is disposed at the intermediate height between the first group of tape guides for horizontally pulling out or withdrawing the tape from the cassette and locating the tape, and the second group of tape guides for slantingly pulling out or withdrawing the tape from the cassette and locating the tape, and is constructed in such a manner as to rotate on the plane of that height. Accordingly, the height of the magnetic recording and/or reproduction apparatus can be reduced as a whole. The moving path of the groups of tape guides exists substantially on the rotating plane of the tape guide carrier and runs along its radius of rotation, that is, either coinciding with the radius of rotation or running along its outer periphery thereof. Therefore, the planar area is reduced and a width as well as a height of the apparatus can be reduced. Accordingly, the apparatus can be compact in size and light in weight. Particularly because the second group of tape guides assume the tilted moving path, this moving path and the tape guide carrier can be disposed in such a manner as to overlap in a vertical direction with the same radius. For this reason, the planar area can be further reduced and the apparatus can be compact.

According to the present invention, a positioning mechanism of the tape guides supports the groups of tape guides at the upper and lower sides, and is equipped, at an intermediate portion thereof, with a cut portion so as not to prevent a rotation of the tape guide carrier.

According to advantageous features of the present invention, the tape guide carrier includes a first or entrance side tape guide carrier for carrying the first or entrance side group of tape guides and a second or exit side tape guide carrier for carrying the second or exit side group of tape guides, with a force of rotation being applied to these first and second tape guide carriers by an arcuate cam member controlling a tape transport mechanism such as, for example, a reel brake, a pinch roller, and the like.

Advantageously, according to the present invention, the first and second tape guide carriers and the cam member are disposed concentrically with respect to one another in such a manner so as to overlap in the vertical direction (at the same radius). The arcuate tape guide carrier in accordance with the present invention is disposed at the intermediate height between the first and second groups of tape guides so as to rotate over the plane at that height. Therefore, the overall height of the apparatus can be reduced remarkably.

Moreover, since the moving paths of the first and second groups of tape guides in accordance with the present invention run along the outer periphery of the rotation of the tape guide carrier on its rotating plane in substantial agreement with its radius of rotation, the planar area is not large and the apparatus can be compact.

In accordance with further features of the present invention, at least one of the groups of tape guides slantingly withdraws the magnetic tape from the cassette and locates and supports the tape by the positioning mechanism. At this time, the other end of the tape guide carrier for carrying the groups of tape guides, to which the groups of tape guides are not connected, is at such a position that it does not interfere with the located groups of tape guides and is a such a height that it does not interfere with the groups of tape guides horizontally withdrawn or pulled out from the cassette. Therefore, the tape guide carrier can be disposed substantially on the same planar position as the moving paths of the groups of tape guides and at the same height as that of the groups of tape guides slantingly pulled out or withdrawn.

DESCRIPTION OF THE PREFERRED EMBODIMENTS

Figure 1A:
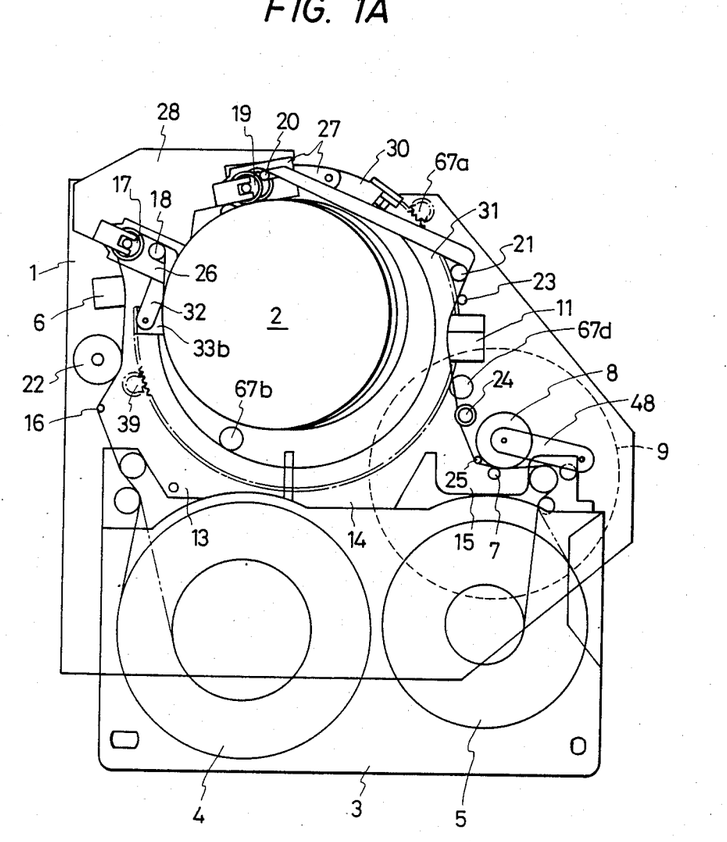
FIGS. 1A and 1B are schematic plan views showing a tape loading mechanism at the loading end position and at the time of unloading, respectively.

Referring now to the drawings wherein like reference numerals are used throughout the various views to designate like parts and, more particularly, to FIG. 1A, according to this figure, a chassis 1 has a tape guide drum 2 disposed thereon at a predetermined tilt angle, with the drum 2 including an upper rotating drum to which a rotary magnetic head is mounted and a lower fixed drum, and with a guide plane guiding the tape at a predetermined tilt angle. A cassette 3 includes a tape 6 wound on a supply reel 4 and a take-up reel 5 and a capstan 7 is directly connected at a lower end to a motor 9. A pinch roller 8, is an erase head 10 for erasing the recorded content over the entire width of the tape 6, and an audio/control head 11 for recording and reproducing an audio signal and a control signal at the upper and lower ends of the tape 6, respectively, are provided.

Figure 1B:
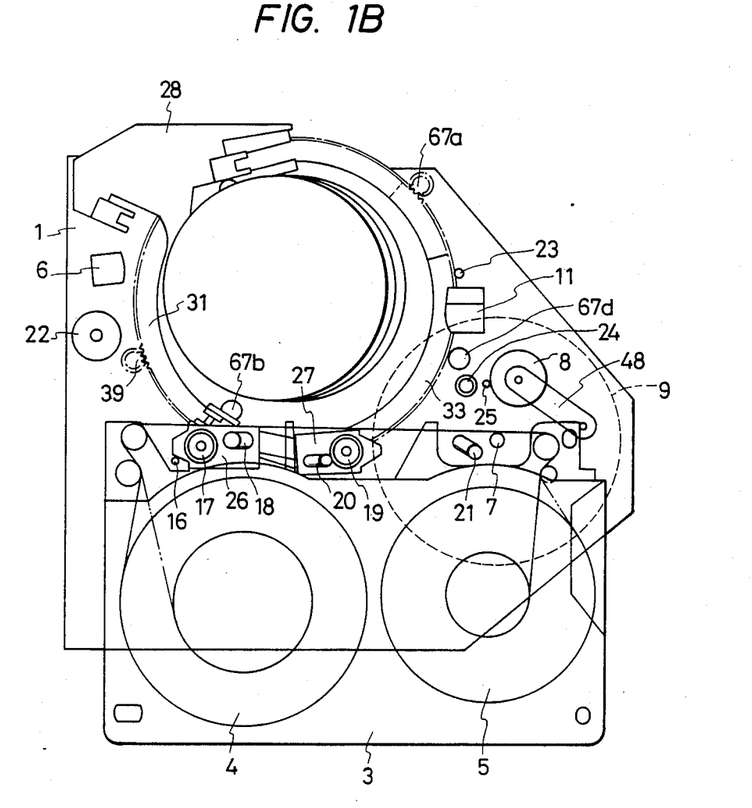
Figure 2A:
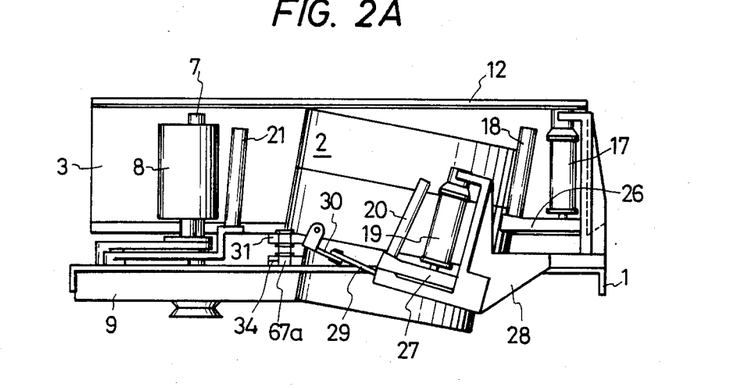
FIGS. 2A and 2B are side views of FIGS. 1A and 1B at an exit, respectively.
Figure 2B:
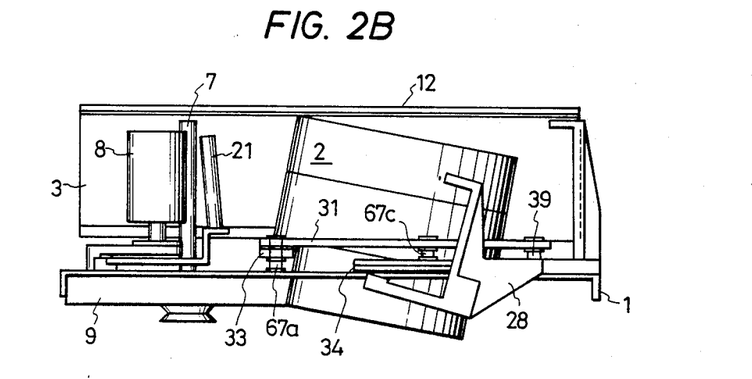
Figure 3A:
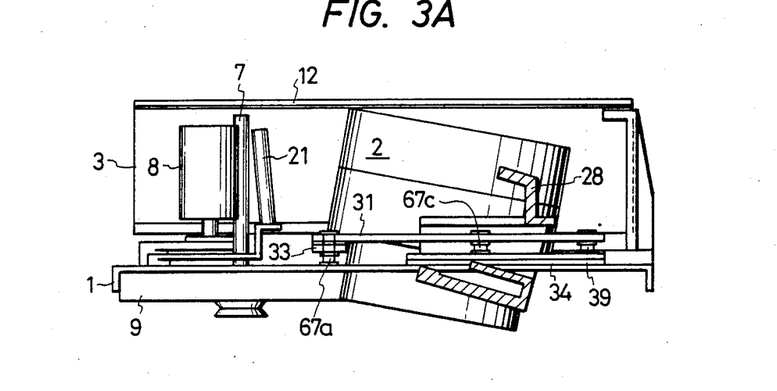
FIGS. 3A and 3B are sectional views of the principal portions of the tape loading mechanism.
Figure 3B:
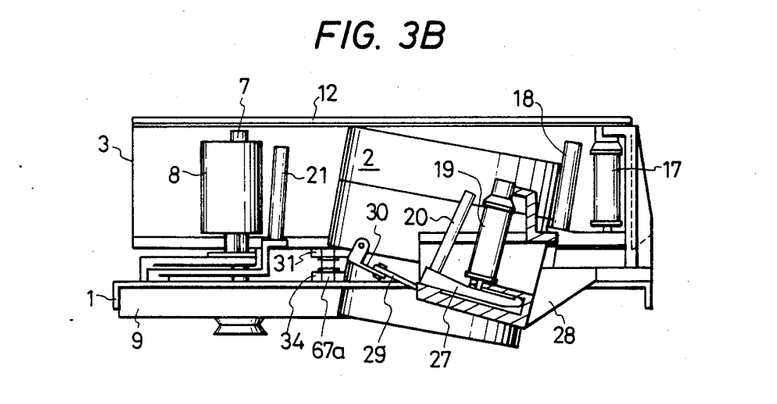

When the cassette 3 is loaded into the apparatus at a predetermined position, a lid on the front surface of the cassette 3 opens and, as shown in FIG. 18, a tension pin 16, a guide roller 17 and a tilted pin 18 are inserted into an opening 13 of the cassette, with a guide roller 19 and a tilted pin 20 being inserted into the opening 14 (FIG. 1A) and with a tilted pin 21 and the capstan 7 being inserted into the opening 15 so that a pinch roller 8 assumes a predetermined position shown in FIG. 1B. When, for example, the VTR main body is brought into playback or reproduction mode by operating the play button (not shown) of the VTR, the tape loading mechanism receives the power of a loading motor so that each of the guides begins operating to pull or withdraw the tape 6 from the cassette 3 and attaches the tape 6 to the tape guide drum 2.

The guide roller 17 and the tilted pin 18 form the first group of tape guides and move in a pair horizontally relative to the chassis 1 and are located near the tape guide drum 2. The guide roller 19 and tilted pin 20, located near the tape guide drum 2 form the second group of tape guides, move in a pair horizontally relative to the chassis 1 to a vicinity of the audio/control head 11, and thereafter slantingly downwardly move to thereby wind the tape 6 to the tape guide drum 2 by about 270. The tilted pin 21 moves horizontally from behind the tilted pin 20, is fixed on the upstream side of the audio/control head 11, corrects the posture of the tape 6, and guides the tape to the take-up reel 5. As a result, after leaving the cassette 3, the tape 6 passes through the tension pin 16, the height limiting guide 22, the erase head 10, the guide roller 17 and the tilted pin 18, is wound helically at a predetermined angle to the tape guide drum 2, and then passes through the guide roller 19, the tilted pin 20, the tilted pin 21, the fixed guide 23, the audio/control head 11, the height limiting guide 24 and the fixed guide 35, and comes into pressure contact with, and is driven by, the capstan 7 and the pinch roller 8, so as to reachly the take-up reel 5.

As shown in FIGS. 2A, 2B, 3A and 3B, a guide base 26, on which the guide roller 17 and the tilted pin 18 are mounted, is located and held by a catcher 28 through the guide roller 17. A guide base 27 has the guide roller 19 and the tilted guide 20 mounted thereon, with the guide base 27 being located in the manner as the guide base 26 through the guide roller 19. As shown in the drawings, the tape guide at the exit of the tape guide drum 2 moves a greater downward distance than the tape guide at the entrance by the width of the tape. Accordingly, the tilt angle of the tape guide drum 2 can be reduced and when the tape guide drum 2 is disposed at a position somewhat lower than the cassette 3, the tape guide drum 2 can be disposed below the front lid 12, which opens to the front of the cassette at the time of loading of the cassette 3 into the apparatus so as to enable the apparatus to be compact.

Figure 4:
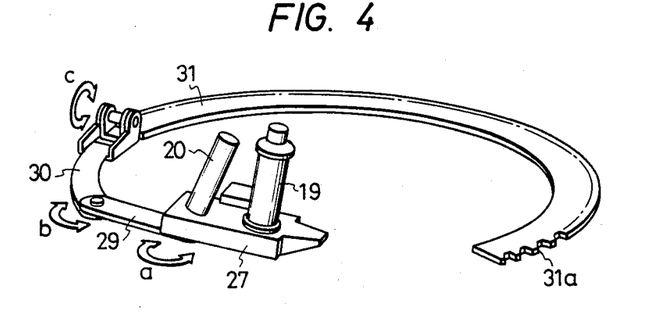
FIG. 4 is a perspective view of a tape guide carrier at exit and a group of tape guides.

As shown in FIG. 4, the guide base 27 onto which the guide roller 19 and the tilted pin 20 are mounted is rotatably supported by a connecting plate 29 inside a plane a, and the connecting plate 29 is rotatably supported inside the plane b by another connecting plate 30. Furthermore, the connecting plate 30 is supported at one end of the carrier 31 in such a manner so as to be capable of swinging in the vertical direction about an axis c. The carrier 31, at an exit thereof, has an arcuate shape and is provided with a gear portion 31a in its entire outer periphery thereof.

Figure 5:
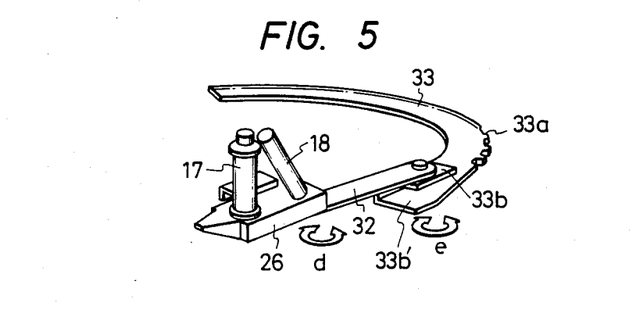
FIG. 5 is a perspective view of a tape guide carrier at entrance and the group of tape guides.

As shown in FIG. 5, the guide base 26 is rotatably supported inside a plane d by a connecting plate 32, and this connecting plate 32 is rotatably supported in a plane e by a ]-shaped portion 33b formed at one of the ends of a carrier 33. The carrier 31 moves below the connecting plate 32 along an inside surface 33b' of the portion 33b at one of the ends of the carrier 33, that is, on the carrier 33, there is no impingement of both carriers or the carrier in the group of guides during their movement. The carrier 33 is also provided with an arcuate shape and a gear portion 33a at an outer periphery thereof.

Figure 6:
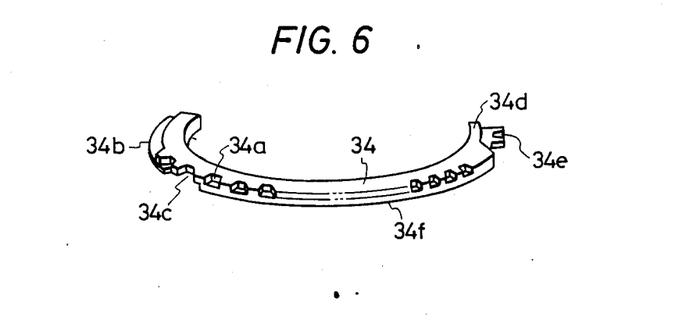
FIG. 6 is a perspective view of a mode operation mechanism by a cam member.

As shown in FIG. 6, a cam 34 includes an upper and a lower stage. A gear portion 34a of the cam 34 and a cam portion 34d are formed on the upper stage of the cam 34, with a stopper surface 34b, corresponding to a Geneva gear, a cam portion 34c corresponding to the mode operation after loading, a cam portion 34f corresponding to the intermediate state of load/unloading operation, and a cam portion 34e corresponding to the mode operation after unloading being formed on the lower stage of the cam 34. The cam 34 has an arcuate shape, and shown most clearly in FIGS. 2B, the carrier 31, the carrier 33, and the cam 34 are disposed concentrically in order named from above on the guide member 67a disposed on the chassis 1.

Figure 10A:
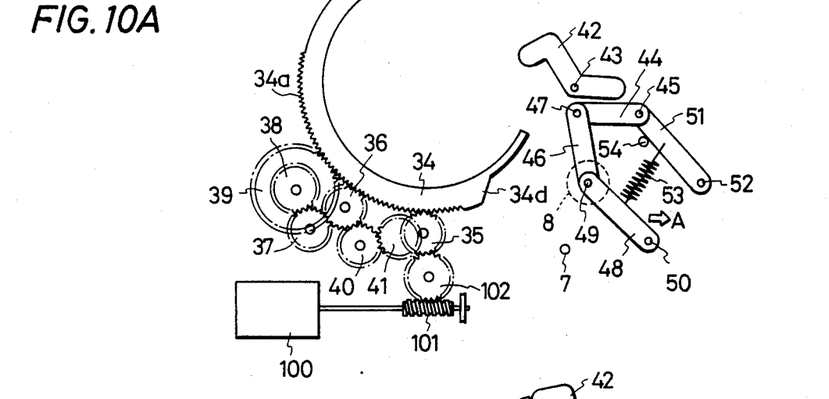
FIGS. 10A, 10B and 10C are plan views of the cam member at the time of unloading, at the intermediate stage of the loading operation and at the end of loading, respectively.
Figure 10B:
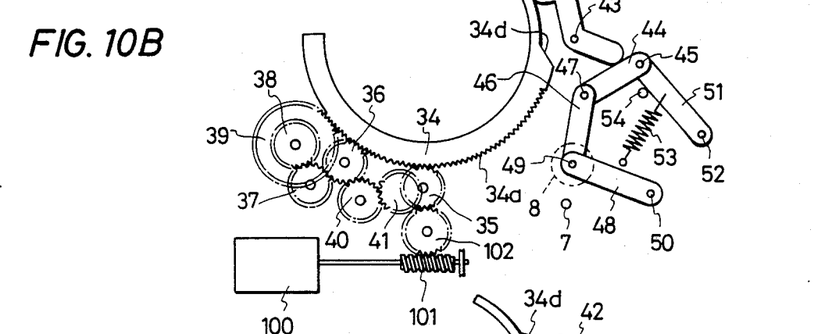
Figure 10C:
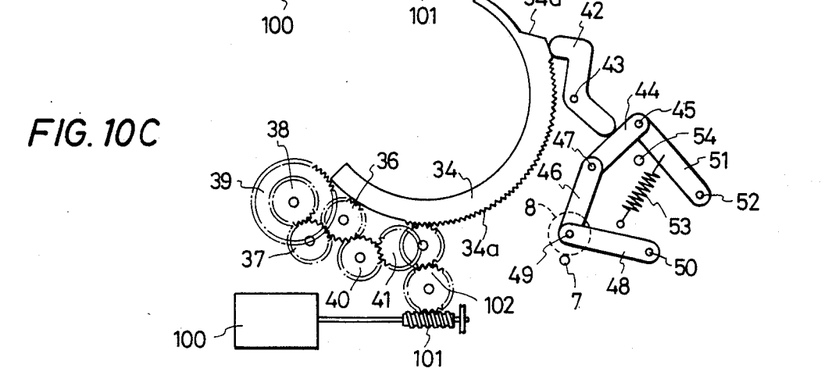

FIGS. 10A, 10B, 10C respectively illustrate the upper stage of the cam 34 and a driving system in the unloading state (FIG. 10A), intermediate state of loading/unloading and (FIG. 10B) and the loading state (FIG. 10C). The cam 34 is driven when a gear 35 which is driven by a driving source 100 meshes with the gear portion 34a. When the cam 34 rotates, the gear 36 meshing with the gear portion 34a also rotates and the carrier 31 is driven when the gear 39 rotates integrally with the gear 38 through the gears 37, 38 and a pressing spring (not shown) meshes with the gear portion 31a. Similarly, the carrier 33 is driven when a gear 41a (FIG. 13) with a built-in pressing spring (not shown) meshes with the gear portion 33a through the gears 40, 41. In the state illustrated in FIG. 10C, loading is complete and the rotation of the gear 36 is stopped by a Geneva gear described more fully hereinbelow and the engagement between the gear 36 and the gear portion 34 is released. On the other hand, in the state illustrated in FIG. 10A, the tip of the arm 42 moves much more greatly inwardly than the moving path (rotating path) of the cam 34 so that the pinch roller 8 is considerably spaced apart from the capstan 7.

Next, in the intermediate state of loading, shown in FIG. 10B, the tip of the cam 34 meshes with the arm 42 and the arm 42 rotates on shaft 43 and rotates the arm 44 counterclockwise on the shaft 45. The arm 44 connects with the arm 46 through the shaft 47 and since the arm 46 meshes with a pinch roller fitting shaft 49 of the arm 48 and the arm 48 is rotatably fitted around the fixed shaft 50, the arm 48 rotates in the opposite direction to the arrow A , (FIG. 10A), due to the rotation of the arm 44 and moves the pinch roller 8, pivoted by the arm 48 to the loading position. Since the arm 48 is energized by a spring (not shown) in the direction of the arrow A, (FIG. 10A), the pinch roller 8 moves back to the unloading position in FIG. 10A wherein the cam 34 does not engage the arm 42. When the cam 34 rotates further from the state illustrated in FIG. 10B and reaches the state illustrated in FIG. 10C, the arm 42 meshes with the cam portion 34d and a toggle mechanism composed of the arms 44 and 46 presses the pinch roller 8 to the capstan 7. The shaft 45 is mounted to the arm 51 rotatably supported around the fixed shaft 52, and the arm 51 is always pulled counterclockwise by the spring 53 and its position is limited by a stopper 54. Accordingly, even after a movement of the pinch roller 8 is stopped, the arm 42 rotates so that the arm 51 moves away from the stopper 54 against the force of the spring 53 and the pressing force between the pinch roller 8 and the capstan 7 is secured.

The carrier 33, carrier 31 and cam 34 are rotatably supported by the common members and move on the same radius of rotation. Therefore, the number of necessary components can be effectively reduced and it is also possible to support each carrier and the cam by separate support means.

Figure 11A:
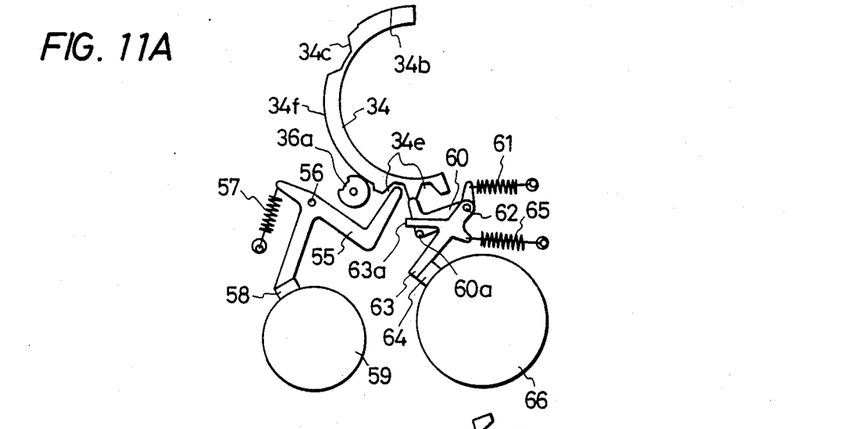
FIGS. 11A, 11B and 11C are plan views of the mode operation mechanism at the time of unloading, at the intermediate stage of loading and at the end of loading by the cam member, respectively.
Figure 11B:
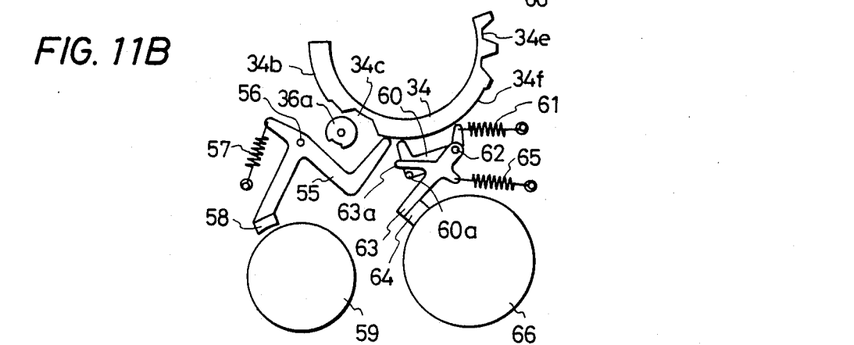
Figure 11C:
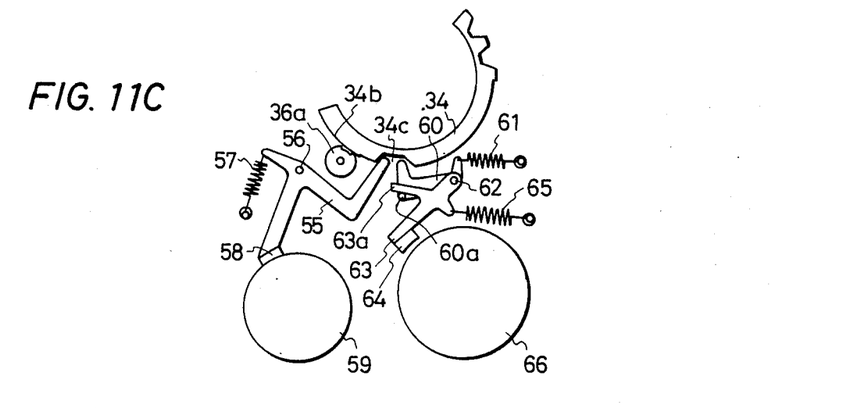

FIGS. 11A, 11B and 11C respectively illustrate the lower stage of the cam 34 and the mode operation mechanism, wherein FIG. 11A is the unloading state, FIG. 11B is the intermediate state of loading and unloading and FIG. 10C is the loading state.

As shown in FIGS. 11A, 11B, 11C, a Geneva gear portion 36a is formed integrally with the gear 36, with one end of an arm 55 meshing with the cam portion 34c or 34e. The arm 55 is biased in a counterclockwise direction around a shaft 56 by a spring 57 mounted to one end of the arm 55. The other end of the arm 55 includes a brake member 58 adapted to apply a brake force to a supply reel base 59.

An arm 60 meshes with the cam portion 34c or 34e and is biased in a counterclockwise direction around a shaft 62 by a spring 61 attached to one of end of the arm 60. An arm 63 has an arm 63a capable of engaging a shaft 60a on the arm 60, with the arm 63 having at one end thereof a spring 65 so as to be biased in a counterclockwise direction around a shaft 62. Furthermore, a brake member 64 is fitted to the other end of the arm 63 so as to apply the brake force to a driving disc 66 meshing with the supply reel base 59. FIG. 11A, in a stop state after unloading, the arm 55 meshes with a concavity of the cam portion 34e to apply the brake force by the brake member 59 to the supply reel base 59. Since the concavity of the cam portion 34e and the arm 55 do not directly mesh with each other at this time, the brake force is determined solely by the force of the spring 57 and is stable regardless of the stroke of the cam portion 34e. The arm 60 meshes also with the convexity of the cam portion 34e and releases the engagement between the shaft 60a and the arm 63a against the force of the spring 61. Therefore, the brake force is applied to the driving disk 66 by the force of spring 65 alone and can be stably secured regardless of the stroke of the cam portion 34e.

In FIG. 11B, the arms 55 and 60 engage the cam portion 34f and only the braking force to the supply reel base 59 is released. Therefore, the tape is delivered fundamentally from the supply reel at the time of loading. Incidentally, when the state of the apparatus shifts from that illustrated in FIG. 11A to FIG. 11B, the arm 60 drops into the concavity of the cam portion 34e and the brake 64 is released at this time. This state corresponds to the FF (Fast Forward)/REW (Rewind) mode and, since the arm 55 is displaced from the convexity of the cam portion 34e to the convex portion of the cam 34 at the same time, the brake 58 is also released. Accordingly, both the brakes 64 and 58 are released and the operation mode enters the FF/REW mode. However, if loading is started directly from the state of unloading stop without making the FF/REW operation, the brake 64 is instantaneously released and the take-up reel rotates to deliver a small amount of tape; however, no critical problems arise because the time interval of delivery is extremely short, the shaft loss of the take-up reel base is at a constant level becasue the loading operation is immediately carried out, and the group of tape guides then move forward, and so forth.

The state illustrated in FIG. 11C represents the recording/playback state wherein, though the braking force applied to the supply reel base 59, the arm 60 meshes with the concavity of the cam portion 34c and is rotated by the tensile force of the spring 61, and the shaft 60a engages with the arm 63a and rotates the arm 63 against the force of the spring 65 to release the braking force applied by the brake member 64 from the driving disc 66. At this time, the Geneva gear 36a of the gear 36 meshes with the stopper surface 34b so that the driving force from the gear 35 is interrupted by the gear 36 and the rotation of the members after the gear 36 is stopped so that the carriers 31 and 33 are stopped and the pressing force to the positioning member of each tape guide group is maintained. The pressing force at this time is obtained by the pressing spring interposed between the gears 38 and 39 and the pressing spring incorporated in the gear 41a. Since the motion of the cam 34 is transmitted to the carriers through a change mechanism such as a Geneva gear as described above, this arrangement can easily cope with the increase in the number of operation modes.

Figure 13:
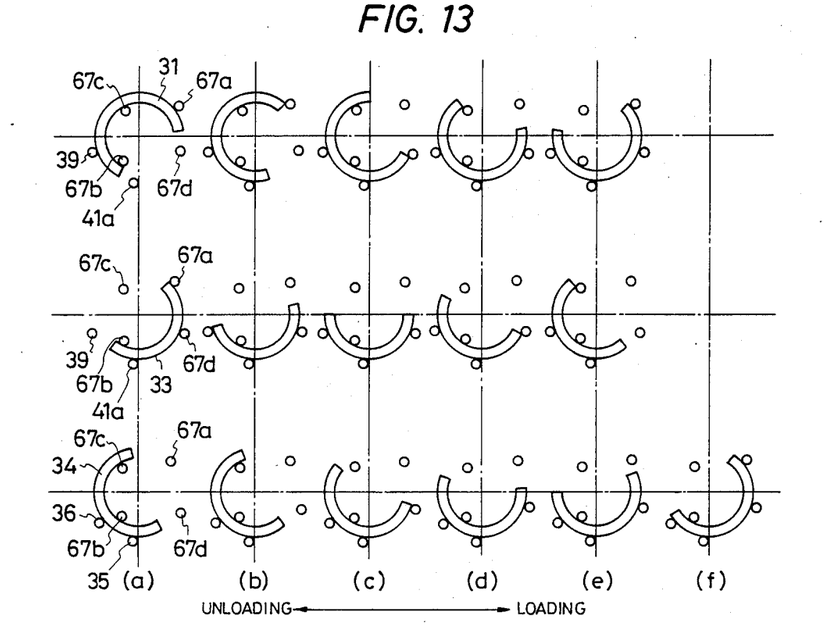
FIG. 13 is a timing chart of the tape guide carrier and the cam member.

In FIG. 13, the symbols (a), (e), and (f) represent an eject state, the loading end state and the operation mode such as recording/playback, respectively. The shape of the carriers 31, 33 and cam 34 is represented by the arcuate shape for simplification. The rollers 67b and 67c are cylindrical rollers which come into contact with the carriers 31, 33 and the cam 34 from the inner periphery, and 67a and 67d are gears which come into contact with the carriers 31, 33 and the cam 34 from the outer periphery.

As apparent from FIG. 13, the length of the arc of the cam 34 and its position during rotation are set such that the cam 34 does not impinge against the tape guide groups 19, 20 (not shown in FIG. 13) which are fitted to the tip of the carrier 31 at exit and move slantingly downward towards the loading position. Therefore, the cam 34 can be disposed at a position sufficiently higher than the lowermost position of the guide groups 19, 20.

Figure 7:
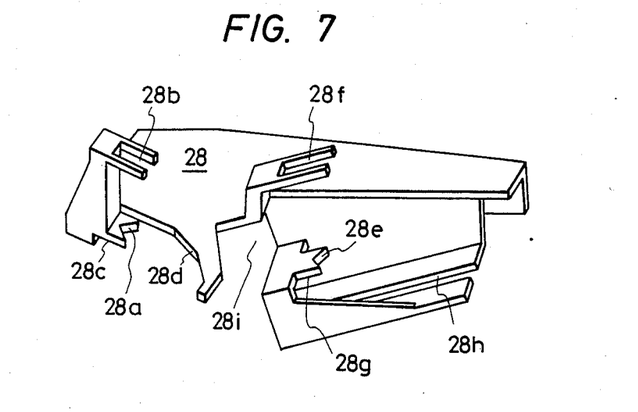
FIG. 7 is a perspective view of a catcher or tape guide locating mechanism.

As shown in FIG. 7, the catcher 28 has a unitary structure for locating the entrance and exit tape guide groups of the tape guide drum 2. As to the tape guide group at the entrance, the shaft portion at the lower part of the guide roller 17 is located by the V-shaped groove 28a and its upper part is limited by the U-shaped groove 28b in order to prevent the guide roller from falling in an orthogonal direction to the entering direction of the guide roller 17. The height of the guide roller 17 is restricted when the upper part of the tip of the guide base 27 (FIG. 3B) abuts against the stopper plane 28c. The inclination of the tilted pin (FIG. 3B) is limited when the side surface of the guide base 27 comes into contact with the wall 28d. This also holds true of the tape guide group at the exit. Namely, the position and angle of the guide roller 19 (FIGS. 2A, 3B) are limited by the V- and U-shaped grooves 28e and 28f, and the height is limited by the stopper plane 28g. The inclination of the tilted pin 20 is limited by the wall 28h. Furthermore, a cut portion 28i is defined between the V- and U-shaped grooves 28e and 28f of the catcher 28. In the unloading state, one of the ends of the cam 34 and one of the ends of the carrier 31 at exit penetrate through the cut portion 28i but escape from the cut portion 28i by the loading operation. Therefore, in the loading end state, the guide roller 19 as well as the tilted pin 20 can be kept at the predetermined positions. Since the apparatus of the invention employs the arrangement wherein the cut portion is positioned at the position to which the tape guide groups slantingly move at the time of loading and that the exit and entrance carriers enter there at the time of unloading, the apparatus can be made compact.

Figure 8:
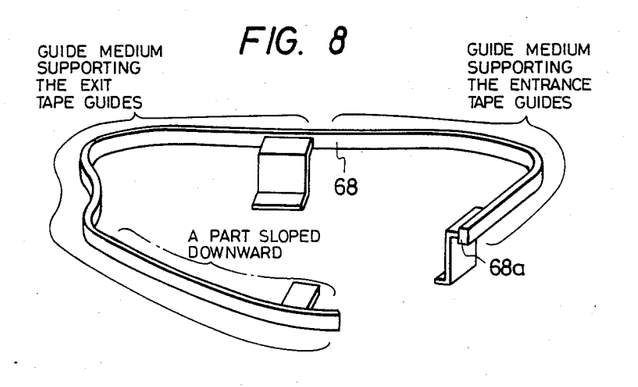
FIG. 8 is a perspective view of a tape guide member.
Figure 9:
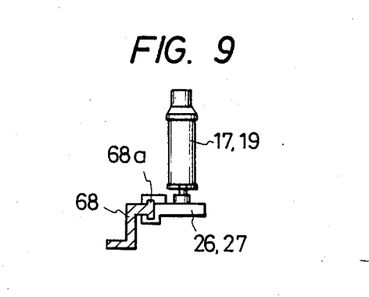
FIG. 9 is a side view of the tape guide member.

As shown in FIG. 8, the guide medium 68 of the tape guide group has a unitary structure including a guide guide medium which supports the entrance tape guide and a guide medium which supports the exit tape guide group, and the tip of the guide medium of the exit tape guide group has a downwardly directed slope in a direction of the tape travelling path. The tip 68a of the section of the guide medium 68 meshes with the guide base 26 or 27 so as to be hooked to the latter, as shown most clearly in FIG. 9, and limits the moving path of the guide base 26 or 27.

Since the exit guide groups 19, 20 and the entrance guide groups 17, 18 are determined by the guide medium 68 as described above, they are not always in agreement with the radius of rotation of the carriers 31, 33. However, almost throughout the loading period, these guide groups pass substantially along the moving path of the carriers 31, 33.

Figure 12:
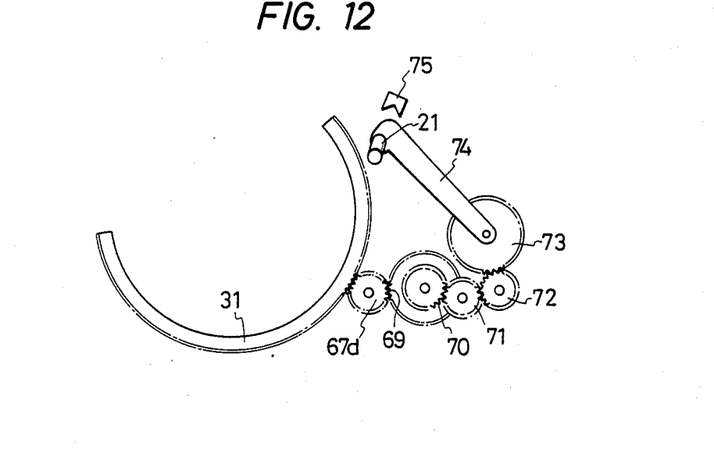
FIG. 12 is a plan view of a carrying mechanism of a tilted guide at exit.

As shown in FIG. 12, the carrier 31 at exit and the supporting roller 67d mesh with each other substantially at the intermediate position of (c) and (d) shown in FIG. 13. The gear portion of the supporting roller 67d meshes with the gear 69 and, after the speed of the gear 70 which is integral with the gear 69 is reduced to about half, it rotatably drives the gear 73 through the gears 71 and 72.

The gear 73 coaxially engages the arm 74 through a pressing spring (not shown) and moves and presses the tilted pin 21 mounted to the tip of the arm 74 to a predetermined position determined by the catcher 75. The tilted pin 21, is driven at the timing described above and is loaded from behind the guide base 27 so as to follow up the latter. In other words, since the moving paths of the tilted pin 21 and guide base 27 partially overlap, the position of the supporting roller 67d and the reduction ratio of the driving system of the arm 74 are set in such a manner that when the guide base 27 passes by the overlap portion, the carrier 31 meshes with the supporting roller 67d and drives the tilted pin 21. Therefore, since the motion of the carrier 31 does not control the motion of the arm 74, no interference occurs at the overlap portion. Support of the carrier 31 at exit and transmission of the driving force to the carrier 31 are performed by one supporting roller 67d and, for this reason, the number of necessary components can be reduced.

In accordance with the present invention as described above, the cam member for controlling the mode operation mechanism for driving the tape has an arcuate shape. Therefore, the position of height of the cam member can be set at a position sufficiently higher than the lower end of the tape guide at the lowermost position which moves downward upon loading, the radius of rotation of the cam member can be brought into conformity with that of the tape guide driving member. Moreover, the arc length and range of rotation of the cam member can be so designed that the movement of the tape guide moving downward for loading is not prevented at any time. Accordingly, the planar area of the apparatus can be reduced sufficiently and the thickness of the apparatus can be considerably less than that of the conventional apparatuses. Moreover, since the mode of operation mechanism can be controlled by the end surface portion of the arcuate cam portion, the stroke of cam control can be increased.

What is claimed is:

1. A tape loading mechanism of a magnetic recording and/or reproduction apparatus comprising:
   a tape guide drum means having a rotary magnetic head mounted thereon;
   groups of tape guide means for withdrawing a magnetic tape from a cassette, winding the magnetic tape on said tape guide drum means and forming a travelling path for the magnetic tape;
   tape guide carrier means disposed substantially concentrically with said tape guide drum means for causing said groups of tape guide means to be displaced to and from an unloading position and a loading position;
   a tape guide locating means for locating and holding said groups of tape guide means as they move between the loading and loading position to define the travelling path of said magnetic tape;
   said groups of tape guide means include a first group of tape guide means located and held by said tape guide locating means for substantially horizontally withdrawing said magnetic tape from said cassette, and a second group of tape guide means is located and held by said tape guide positioning means for substantially horizontally withdrawing said magnetic tape from said cassette to a predetermined position and then for obliquely pulling said magnetic tape, said tape guide carrier means are formed in an arcuate shape and are mounted so as to be rotatable around said tape guide drum means and to drive said groups of tape guide means, said tape guide carrier means are connected at one end thereof to said groups of tape guide means and are displaced at a position of height which is an intermediate height of a height of said first and second groups of tape guide means so that a plane of said tape guide carrier means rotating around said tape guide drum means is positioned between said first and second groups of tape guide means.

2. The tape loading mechanism of a magnetic recording and/or reproduction apparatus as defined in claim 1, wherein said tape guide locating means includes supporting means for locating and supporting said first and second groups of tape guide means at an upper end and a lower end thereof, respectively, and wherein a cut means is formed at the intermediate height so as to enable said tape guide carrier means to rotate freely at said intermediate height.

3. The tape loading mechanism of a magnetic recording and/or reproduction apparatus as defined in claim 1, wherein said first group of tape guide means includes rollers disposed on an entrance side of said tape guide drum means at said loading position, and said second group of tape guide means includes rollers disposed on an exit side of said tape guide drum means.

4. The tape loading mechanism of a magnetic recording and/or reproduction apparatus as defined in claim 1, wherein said tape guide carrier means includes a first tape guide carrier means for driving said first group of tape guide means and a second tape guide carrier means for driving said second group of tape guide means, and said first and second tape guide carrier means are vertically spaced and disposed at said intermediate height.

5. The tape loading mechanism of a magnetic recording and/or reproduction apparatus as defined in claim 4, further comprising tilted pin means for guiding said magnetic tape, said tilted pin means being disposed at said loading position between said second group of tape guide means and a tape take-up means separately from said second group of tape guide means on the exit side, and a tilted pin means driving means for causing said tilted pin means to be displaced to and from said unloading position and said loading position, said tilted pin means driving means being controlled by said second tape guide carrier means, and wherein said second tape guide carrier means through a rotatable guide base means, and said second tape guide carrier means causes said tilted pin means to travel partly along the same path as said rotatable guide base means at a timing following said rotatable guide base means.

6. The magnetic recording and/or reproduction apparatus as defined in claim 1, further comprising a mode operation means for changing operating modes of said magnetic tape and a control means for controlling said mode operation means, wherein said control means includes and arcuate member having a cam means for controlling said mode operation means on at least one of an inner periphery and an outer periphery thereof, said control means is disposed so as to rotate around said tape guide drum means at substantially the same radius as a radius of said tape guide carrier means at a position higher than a lower end of the other of said tape guide means at said loading position, and wherein an arc length and position during rotation of said carrier means and said control means are set so as not to prevent a downward movement of the other of said tape guide means.

7. The magnetic recording and/or reproduction apparatus as defined in claim 6, wherein said mode operation means further includes and arm means for operating a pinch roller means for pressing said magnetic tape to a capstan, said arm means extends from outside to inside across a rotating path of said control means when said arm means is non-operational, and wherein said control means is constructed in such a manner that the cam means inclusive of an end surface portion thereof in an arc direction engages with said arm means and operates said arm means.

8. The magnetic recording and/or reproduction apparatus as defined in claim 6, wherein said mode operation means further includes a brake arm means having a brake means mounted thereon for braking a reel of the cassette is mounted, and wherein said brake arm means is operated by a cam means disposed along an outer periphery of said control means.

9. The magnetic recording and/or reproduction apparatus as defined in claim 6, wherein said tape guide carrier means is driven by said control means.

* * * * *